(12) United States Patent
Heckmeier et al.

(10) Patent No.: US 7,033,651 B2
(45) Date of Patent: Apr. 25, 2006

(54) LIQUID-CRYSTAL MEDIUM HAVING A LOW THRESHOLD VOLTAGE

(75) Inventors: Michael Heckmeier, Bensheim (DE); Detlef Pauluth, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/257,635

(22) PCT Filed: Apr. 17, 2001

(86) PCT No.: PCT/EP01/04337

§ 371 (c)(1), (2), (4) Date: Apr. 22, 2003

(87) PCT Pub. No.: WO01/79379

PCT Pub. Date: Oct. 25, 2001

(65) Prior Publication Data

US 2003/0197152 A1 Oct. 23, 2003

(30) Foreign Application Priority Data

Apr. 17, 2000 (DE) ................. 100 18 957

(51) Int. Cl.
- C09K 19/30 (2006.01)
- C09K 19/34 (2006.01)
- C09K 19/12 (2006.01)
- C09K 19/20 (2006.01)

(52) U.S. Cl. ............. 428/1.1; 252/299.61; 252/299.63; 252/299.66; 252/299.67; 252/299.01

(58) Field of Classification Search ................. 428/1.1; 252/299.01, 299.61, 299.63, 299.64, 299.66, 252/299.67, 299.69

See application file for complete search history.

(56) References Cited

U.S. PATENT DOCUMENTS 5,919,396 A * 7/1999 Tarumi et al. ......... 252/299.01

(Continued)

FOREIGN PATENT DOCUMENTS

DE 19528106 A1 8/1996

(Continued)

*Primary Examiner*—Shean C. Wu
(74) *Attorney, Agent, or Firm*—Millen, White, Zelano & Branigan, P.C.

(57) ABSTRACT

The invention relates to a liquid-crystalline medium comprising a mixture of at least two compounds of the general formula (I)

$R^1-A_m-B_n-Z^1-C-Z^2-D-R^2$ (I)

in which
$R^1$ is H, an alkyl or alkenyl radical having 1 to 15 carbon atoms and 2 to 15 carbon atoms, respectively, which is unsubstituted, monosubstituted by CN or $CF_3$ or at least monosubstituted by halogen, where one or more $CH_2$ groups in these radicals may also, in each case independently of one another, be replaced by —O—, —S—,

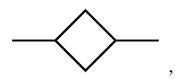

,

—CO—, —CO—O—, —O—CO— or —O—CO—O— in such a way that O atoms are not linked directly to one another;
A, B, C and D are each, independently of one another,

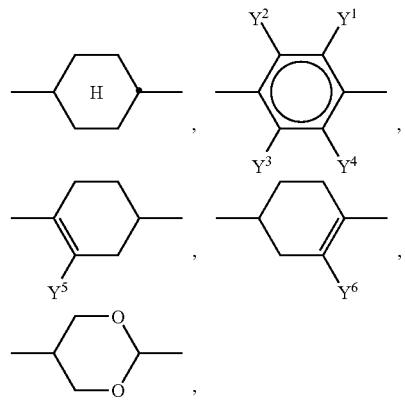

in which
Y, $Y^1$, $Y^2$, $Y^3$, $Y^4$, $Y^5$ and $Y^6$ are each, independently of one another, H or F;
C is, in addition to the abovementioned meanings,

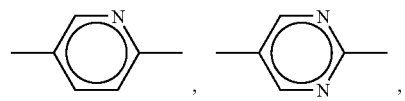

$Z^1$ and $Z^2$ are each, independently of one another, a single bond, —$CH_2O$—, —$OCH_2$—, —$CH_2$—$CH_2$—, —CH=CH—, —C≡C—, —$CF_2$—$CF_2$—, 13 $CF_2O$—, —$OCF_2$— or —CO—O—;
$R^2$ is, in addition to the abovementioned meanings of $R^1$, F, $CF_3$, $OCF_3$, $OCHF_2$, $OCH_2CF_2H$;
and
m and n are each, independently of one another, 0 or 1, with the proviso that $Z^1$ is a single bond when m and n are 0, characterized in that the mixture comprises
a) from 30 to 90% by weight of compounds of the general formula (I) having $\Delta\varepsilon \geq 9$ (=highly polar compounds);
b) from 0 to 30% by weight of compounds of the general formula (I) having $1 \leq \Delta\varepsilon \leq 9$ (=polar compounds);
c) from 10 to 40% by weight of compounds of the general formula (I) having $-1 \leq \Delta\varepsilon \leq 1$ (=neutral compounds);
the sum of a), b) and c) being 100% by weight.

17 Claims, No Drawings

U.S. PATENT DOCUMENTS

| | | | |
|---|---|---|---|
| 5,976,407 A * | 11/1999 | Tarumi et al. | 252/299.01 |
| 5,993,691 A * | 11/1999 | Pausch et al. | 252/299.63 |
| 5,993,692 A * | 11/1999 | Tarumi et al. | 252/299.63 |
| 6,045,878 A | 4/2000 | Tarumi et al. | |
| 6,083,573 A | 7/2000 | Tarumi et al. | |
| 6,146,720 A | 11/2000 | Pausch et al. | |
| 6,506,462 B1 | 1/2003 | Tarumi et al. | |

FOREIGN PATENT DOCUMENTS

| | | |
|---|---|---|
| DE | 19629812 A1 | 2/1997 |
| DE | 19532292 A1 | 3/1997 |
| DE | 19748618 A1 | 6/1998 |
| DE | 10002462 A1 | 8/2000 |
| JP | 2000230175 A2 | 8/2000 |

* cited by examiner

LIQUID-CRYSTAL MEDIUM HAVING A LOW THRESHOLD VOLTAGE

The present invention relates to a liquid-crystalline medium, and to electro-optical displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials generally must have good chemical and thermal stability and good stability to electric fields and electromagnetic radiation. Furthermore, the liquid-crystal materials should have low viscosity and give short response times, low threshold voltages and high contrast in the cells.

They should furthermore have a suitable mesophase, for example a nematic mesophase for the abovementioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, liquid-crystal media having large positive dielectric anisotropy, broad nematic phases, relatively low birefringence, very high resistivity, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, besides passive elements such as varistors or diodes, active elements such as transistors. This case is then referred to as an "active matrix".

In more promising TFT (thin film transistor) displays, the electro-optical effect utilized is usually the TN effect. A distinction is made between TFTs comprising compound semiconductors, for example CdSe, or TFTs based on polycrystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel. The TFT displays usually operate as TN cells with crossed polarizers in transmission and are backlit.

MLC displays of this type are used as displays in notebook computers, for televisions (pocket TVs) or in automobile or aircraft construction. Besides problems regarding the angle dependence of the contrast and the response times, difficulties also arise in these MLC displays due to inadequate resistivity of the liquid-crystal mixtures. With decreasing resistance, the contrast of an MLC display drops, and the problem of "image sticking" can occur. Since the resistivity of the liquid-crystal mixture generally drops over the life of an MLC display owing to interaction with the interior surfaces of the display, a high (initial) resistance is very important in order to obtain acceptable service lives. In particular in the case of mixtures having a low threshold value, it was hitherto impossible to achieve very high resistivities, since liquid-crystalline materials having a high positive dielectric anisotropy $\Delta\varepsilon$ in general also have a relatively high electrical conductivity. It is furthermore important that the resistivity increases as little as possible with increasing temperature and after heating and/or UV exposure. To achieve short switching times, the mixtures must furthermore have a small rotational viscosity. To be able to use the displays even at low temperatures, for example for outdoor, automobile or avionics applications, it is required that crystallization and/or smectic phases do not occur even at low temperatures, and that the temperature dependence of the viscosity is as low as possible. The MLC displays of the prior art do not satisfy these requirements.

Besides liquid-crystal displays which use backlighting, i.e. are operated transmissively and optionally transflectively, there is also interest in reflective liquid-crystal displays. These reflective liquid-crystal displays use the ambient light for information display. They thus consume significantly less energy than backlit liquid-crystal displays of corresponding size and resolution. Here, as is the case in the transmissive TFT-TN displays which are already conventional, the use of liquid crystals of low birefringence ($\Delta n$) is necessary in order to achieve low optical retardation ($d \cdot \Delta n$).

There thus continues to be a great demand for MLC displays which have very high resistivity at the same time as a broad operating temperature range, short response times, even at low temperatures, and a low threshold voltage, and which do not have these disadvantages, or only do so to a reduced extent.

To this end, liquid-crystalline media are desried which have the following properties:

expanded nematic phase range, in particular down to low temperatures, and low temperature dependence of the viscosity for use of the displays even at low temperatures;

high resistance to UV radiation for a long life of the displays;

high positive dielectric $\Delta\varepsilon$ for a low threshold voltage $V_{th}$;

low birefringence for improved observation angle range;

low rotational viscosity $\gamma_1$ for short switching times.

It is an object of the invention to provide liquid-crystalline media for IPS, MLC, TN or STN displays, which have very high resistivities, low threshold voltages, short switching times and low birefringence values while maintaining the other boundary conditions.

This object is achieved by a liquid-crystalline medium comprising a mixture of at least two compounds of the general formula (I)

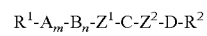 (I)

in which

R[1] and R[2] are each an alkyl or alkenyl radical having 1 to 15 carbon atoms and 2 to 15 carbon atoms, respectively, which is unsubstituted, monosubstituted by CN or $CF_3$ or at least monosubstituted by halogen, where one or more $CH_2$ groups in these radicals may also, in each case independently of one another, be replaced by —O—, —S—,

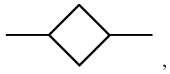

—CO—, —CO—O—, —O—CO— or —O—CO—O— in such a way that O atoms are not linked directly to one another;

A, B, C and D are each, independently of one another,

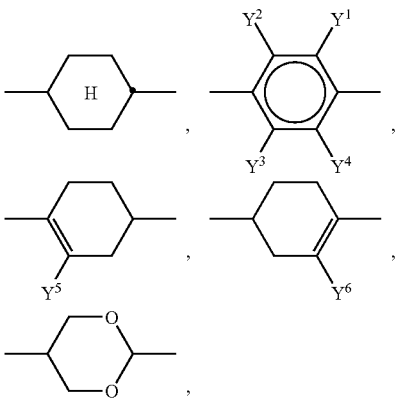

in which

Y[1], Y[2], Y[3], Y[4], Y[5] and Y[6] are each, independently of one another, H or F;

C is, in addition to the abovementioned meanings,

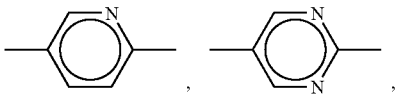

Z[1] and Z[2] are each, independently of one another, a single bond, —$CH_2O$—, —$OCH_2$—, —$CH_2$—$CH_2$—, —CH=CH—, —C≡C—, —$CF_2$—$CF_2$—, —$CF_2O$—, —$OCF_2$— or —CO—O—;

R[2] is, in addition to the abovementioned meanings, F, $CF_3$, $OCF_3$, $OCHF_2$, $OCH_2CF_2H$;

and m and n are each, independently of one another, 0 or 1, with the proviso that Z[1] is a single bond when m and n are 0, characterized in that the mixture comprises a) from 30 to 90% by weight of compounds of the general formula (I) having $\Delta\epsilon \geq 9$(=highly polar compounds);

b) from 0 to 30% by weight of compounds of the general formula (I) having $1<\Delta\epsilon<9$(=polar compounds); and c) from 10 to 40% by weight of compounds of the general formula (I) having $-1 \leq \Delta\epsilon \leq 1$(=neutral compounds); the sum of a), b) and c) being 100% by weight.

It has been found that the combination of highly polar and neutral liquid-crystalline compounds according to the invention makes it possible to obtain liquid-crystalline media which have a low threshold voltage $V_{th}$ and simultaneously a particularly low rotational viscosity and thus a particularly short switching time of these media in the cells.

In a preferred embodiment, the mixture comprises a) from 40 to 80% by weight of highly polar compounds;

b) from 0 to 25% by weight of polar compounds and c) from 15 to 40% by weight of neutral compounds.

In another preferred embodiment, the mixture comprises a) from 70 to 90% by weight of highly polar compounds, b) from 0 to 10% by weight of polar compounds and c) from 10 to 20% by weight of neutral compounds.

R[1] and R[2] can each be a straight-chain or branched alkyl and/or alkoxy radical having 1 to 15 carbon atoms. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

R[1] and R[2] can each be oxaalkyl, preferably straight-chain 2-oxapropyl (=methoxymethyl), 2-(=ethoxymethyl) or 3-oxabutyl (=methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl, or 2-, 3-, 4-, 5-, 6-, 7-, 8-, or 9-oxadecyl.

R[1] and R[2] can each be a straight-chain or branched alkylene radical having 2 to 15 carbon atoms. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

R[1] and R[2] can each be an alkyl radical having 1 to 15 carbon atoms, in which one $CH_2$ group has been replaced by —O— and one has been replaced by —CO—, these being preferably adjacent. This radical thus contains an acyloxy group —CO—O— or an oxycarbonyl group —O—CO—. It is preferably straight-chain and has 2 to 6 carbon atoms. Accordingly, it is particularly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

R[1] and R[2] can each be an alkyl radical having 1 to 15 carbon atoms, in which one $CH_2$ group has been replaced by unsubstituted or substituted —CH=CH— and an adjacent $CH_2$ group has been replaced by CO or CO—O— or O—CO, in which case this can be straight-chain or branched. It is preferably straight-chain and has 4 to 13 carbon atoms. It is particularly preferably acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

$R^1$ and $R^2$ can each be an alkyl or alkenyl radical having 1 to 15 carbon atoms and 2 to 15 carbon atoms, respectively, which is monosubstituted by CN or $CF_3$, this radical preferably being straight-chain. The substitution by CN or $CF_3$ is in any position.

$R^1$ and $R^2$ can each be an alkyl or alkenyl radical having 1 to 15 carbon atoms and 2 to 15 carbon atoms, respectively, which is at least monosubstituted by halogen, this radical preferably being straight-chain and halogen preferably being F or Cl. In the case of polysubstitution, halogen is preferably F. The resulting radicals also include perfluorinated radicals. In the case of monosubstitution, the fluoro or chloro substituent can be in any desired position, but is preferably in the ω-position.

$R^1$ and $R^2$ can each be a straight-chain or branched alkyl radical in which two or more $CH_2$ groups have been replaced by —O— and/or —CO—O—. It is preferably branched and has 3 to 12 carbon atoms. It is particularly preferably biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis-(ethoxycarbonyl)methyl, 2,2-bis(ethoxycarbonyl)ethyl, 3,3-bis(ethoxycarbonyl)propyl, 4,4-bis(ethoxycarbonyl)butyl, 5,5-bis(methyoxycarbonyl)pentyl, 6,6-bis(methoxycarbonyl)hexy, 7,7-bis(methyoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

Preferred highly polar compounds a) meet at least one of the conditions (i) to (iii) in each case:

i) $Z^2$=—CO—O—, $CF_2O$—, —$OCF_2$—, and $R^2$=F, $OCF_3$ ii)

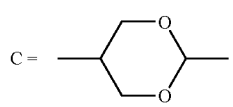

and $Z^2$=single bond, and $R^2$=F, $OCF_3$, $OCHF_2$;

iii)

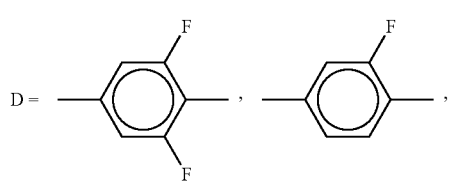

and $R^2$=F, $OCF_3$.

Examples are the Compounds IIa–IIw Below:

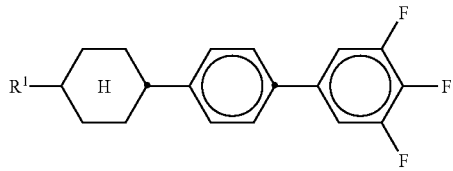
(II a)

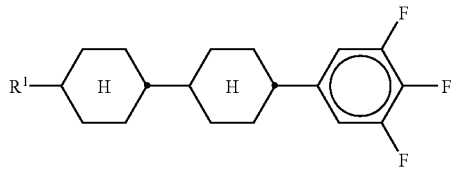
(II b)

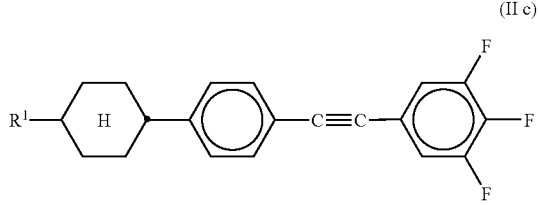
(II c)

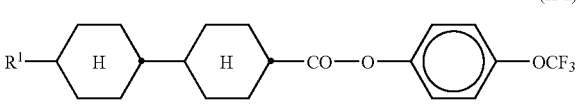
(II d)

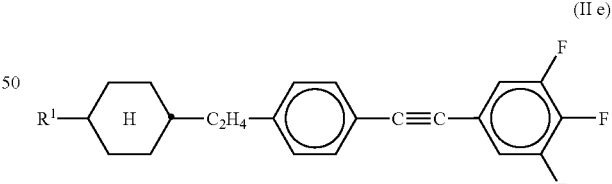
(II e)

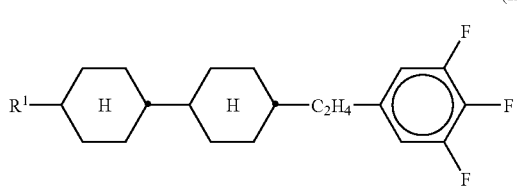
(II f)

(II g)
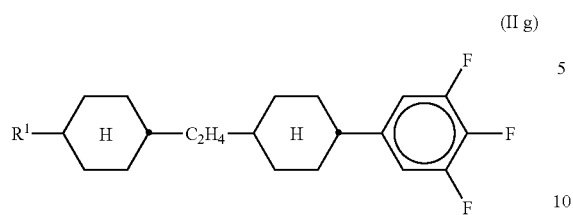
(II h)
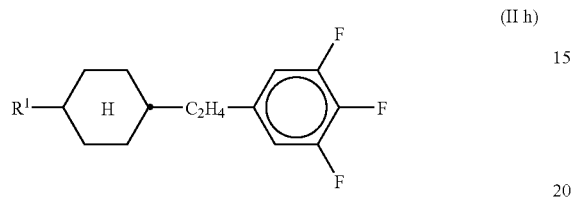
(II i)
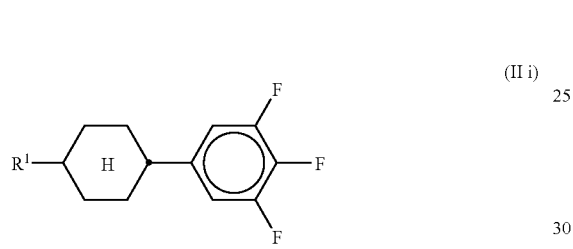
(II j)
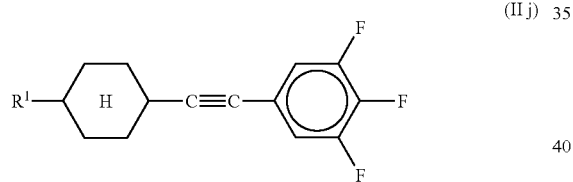
(II k)
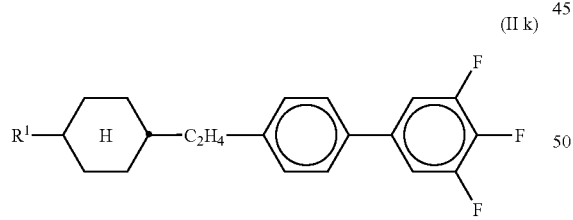
(II l)
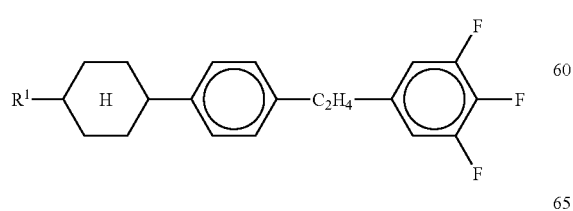
(II m)
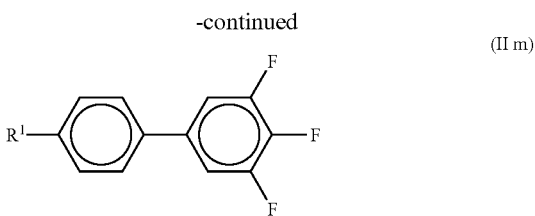
(II o)
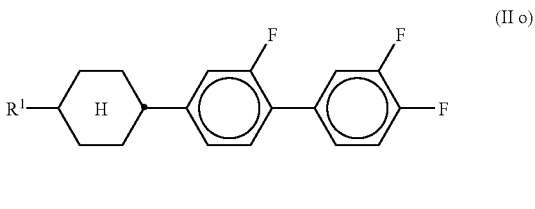
(II p)
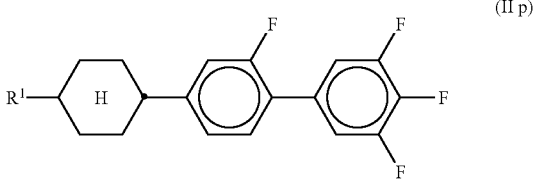
(II q)
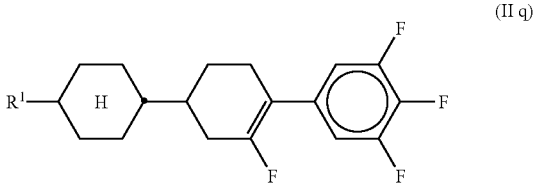
(II r)
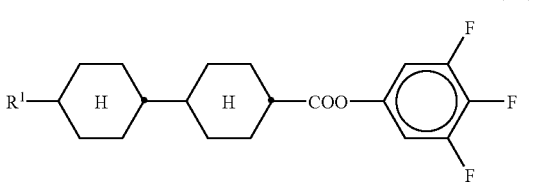
(II s)
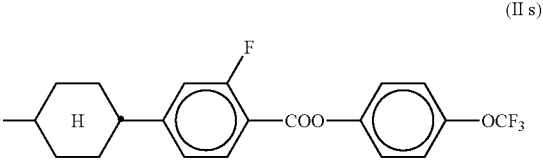
(II t)
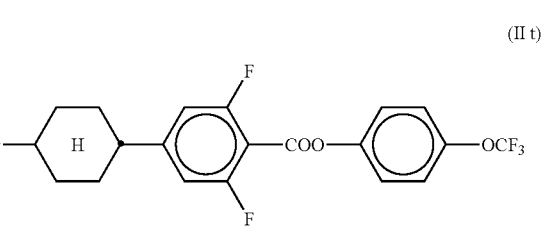

-continued

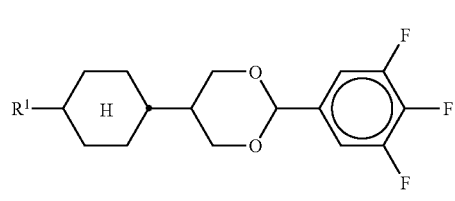
(II u)

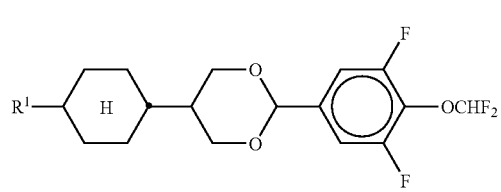
(II v)

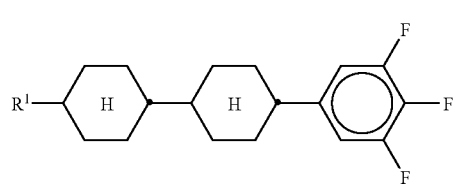
(II w)

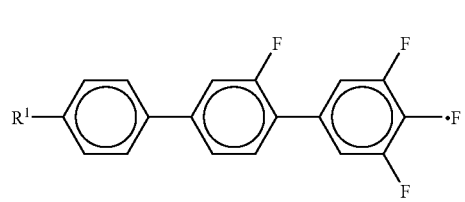
(II x)

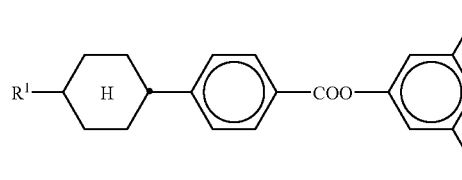
(II y)

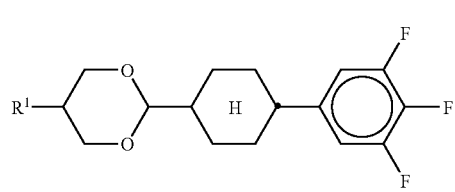
(II z)

In these formulae, R¹ is as defined above.

R¹ is preferably one of the alkyl, alkoxy or alkenyl radicals mentioned.

Preferred polar compounds b) meet the following condition:

Z²=single bond, C₂H₄, —CH=CH—, —C≡CH, —C≡C—, —CF₂—CF₂—, —CF₂O—, and

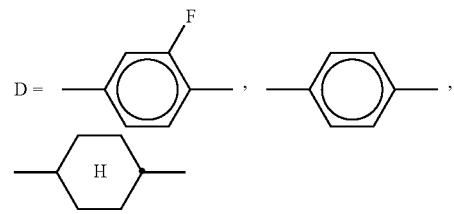

and
R²=F, OCF₃, CF₃.

Examples are the Compounds IIIa–IIIi below:

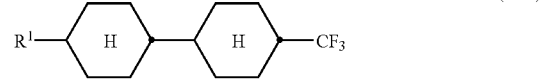
(III a)

(III b)

(III c)

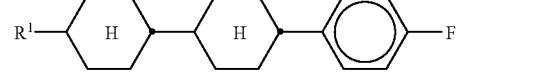
(III d)

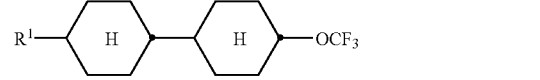
(III e)

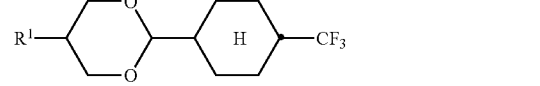
(III f)

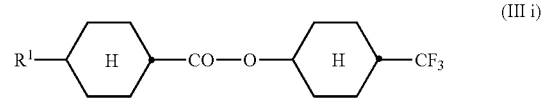
(III g)

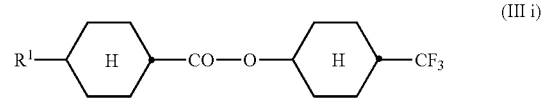
(III h)

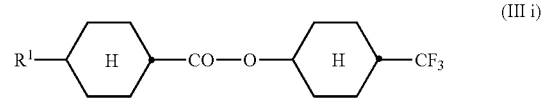
(III i)

In these formulae, R¹ is as defined above.

R¹ is preferably one of the alkyl, alkoxy or alkenyl radicals mentioned.

Preferred neutral compounds c) meet the following conditions:

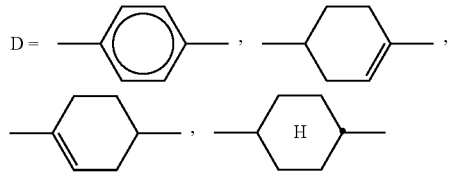

and m and n are 0, and

Z=single bond, —CH$_2$—CH$_2$—, —CH=CH— or —C≡C— when R$^2$=F, CF$_3$, OCF$_3$ or OCHF$_2$.

Examples are the Compounds IVa–IVe Below:

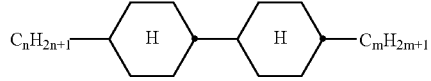
(IVa)

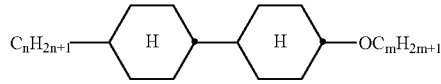
(IVb)

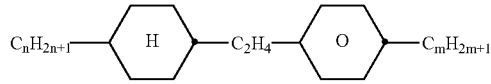
(IVc)

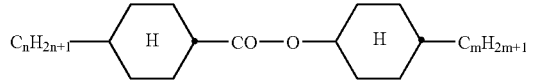
(IVd)

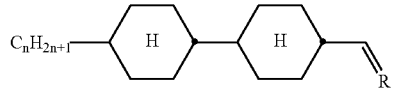
(IVe)

in which R=H, CH$_3$, C$_2$H$_5$, n-C$_3$H$_7$

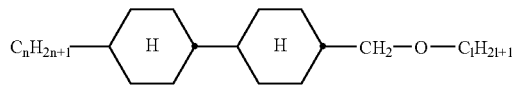
(IVf)

in which n, m=1–15, l=1–13.

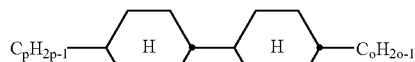
(IVg)

in which o,p=2–15.

Particularly preferred highly polar compounds a) are selected from the group consisting of compounds of the general formulae Va–Ve:

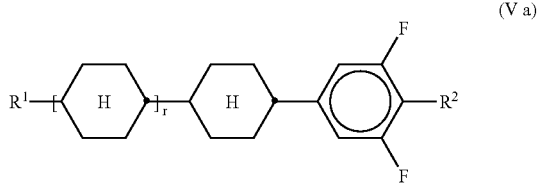
(V a)

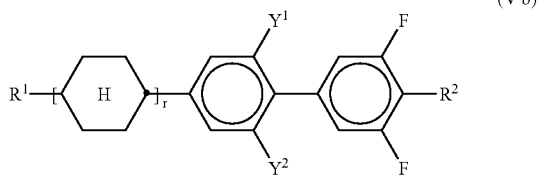
(V b)

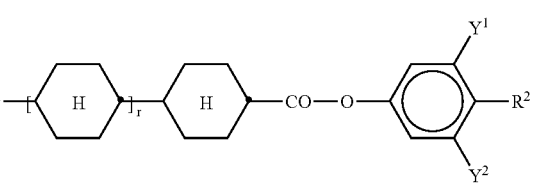
(V c)

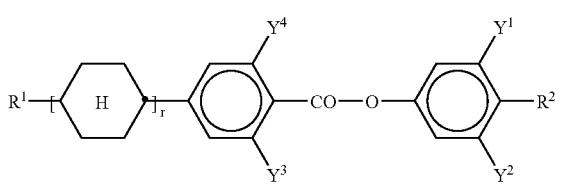
(V d)

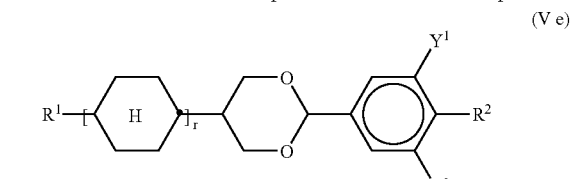
(V e)

in which

R$^1$ is one of the abovementioned alkyl or alkenyl groups having 1 to 15 carbon atoms and 2 to 15 carbon atoms, respectively, Y$^1$, Y$^2$, Y$^3$ and Y$^4$ are each, independently of one another, H or F;

and

R$^2$ is F or OCF$_3$ r is 0, 1 or 2.

Particularly preferred neutral compounds c) are selected from the group consisting of compounds of the general formulae VIa and VIb:

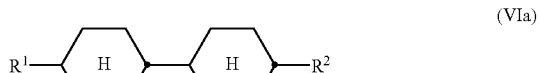
(VIa)

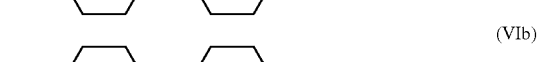
(VIb)

in which $R^1$ and $R^2$ are each as defined above and preferably one of the abovementioned alkyl or alkenyl groups having 1 to 15 carbon atoms and 2 to 15 carbon atoms, respectively.

Particularly preferred polar compounds b) are selected from the group consisting of compounds of the general formulae VIIa and VIIb:

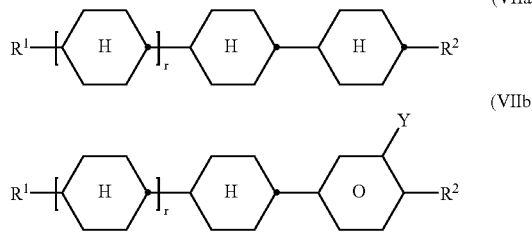

(VIIa)

(VIIb)

in which
$R^1$ is one of the abovementioned alkyl or alkenyl groups having 1 to 15 carbon atoms and 2 to 15 carbon atoms, respectively,
$R^2$ is F, $CF_3$ or $OCF_3$,
Y is H or F,
and
r is 0 or 1.

Very particularly preferred highly polar compounds a) are the compounds of the formulae VIIIa–VIIIx:

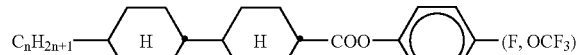
(VIII a, b)

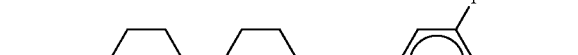
(VIII c, d)

(VIII e, f)

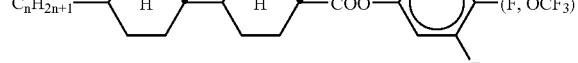
(VIII g, h)

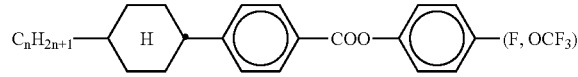
(VIII i, j)

(VIII k, l)

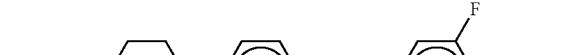

-continued

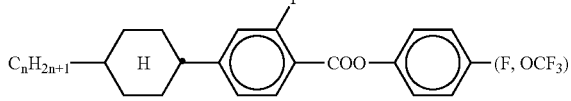
(VIII m, n)

(VIII o, p)

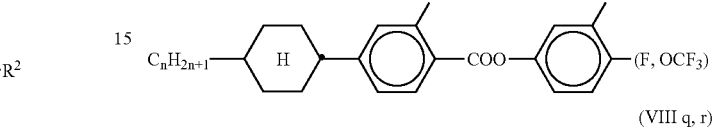
(VIII q, r)

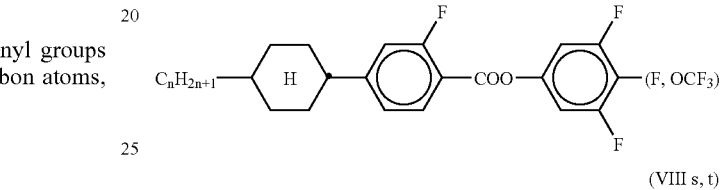
(VIII s, t)

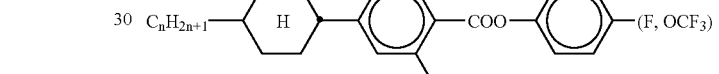
(VIII u, v)

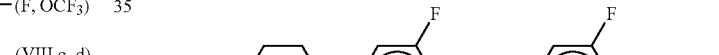
(VIII w, x)

in which n=1–15, preferably 1–7, and all corresponding compounds having a single bond instead of the —CO—O— group, such as, in particular, the compounds of the formulae IXa–IXd.

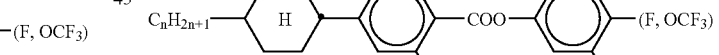
(IXa)

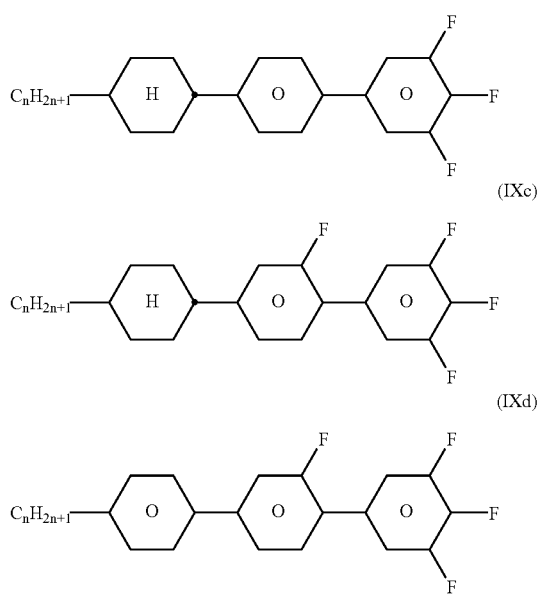

The compounds of the formula I are prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions. Use can also be made here of variants which are known per se, but are not mentioned here in greater detail. Furthermore, the compounds of the formula I can be prepared as described in the patent applications.

The invention also relates to electro-optical displays, in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high resistivity which is located in the cell, which contain the liquid-crystalline media according to the invention, and to the use of these media for electro-optical displays.

The liquid-crystal mixtures according to the invention allow a significant extension of the parameter latitude which is available.

The achievable combinations of clearing point, viscosity rotational, optical anisotropy and threshold voltage are superior to current prior art materials.

The requirement for a low threshold voltage $V_{th}$ and a low rotational viscosity and simultaneously a high clearing point and a nematic phase at low temperature has hitherto only been met inadequately.

While maintaining the nematic phase down to −20° C., preferably down to −30° C., particularly preferably down to −40° C., the liquid-crystal mixtures according to the invention allow clearing points above 70° C., preferably above 80° C., particularly preferably above 90° C., and simultaneously birefringence values of ≦0.12, preferably 0.11, a low threshold voltage and simultaneously a low rotational viscosity to be achieved, allowing excellent STN and MLC displays to be obtained. In particular, the mixtures are characterized by low operating voltages and, short response times.

The TN threshold voltages are in general ≦2.1 V, preferably ≦1.9 V, at a rotational viscosity of ≦90 mPa.s; in general ≦1.9 V, preferably ≦1.7 V, at a rotational viscosity of 110 mPa.s; in general ≦1.7 V, preferably ≦1.5 V, particularly preferably ≦1.4 V, at a rotational viscosity of ≦125 mPa.s; in general ≦1.5 V, preferably ≦1.35 V, particularly preferably ≦1.25 V, at a rotational viscosity of ≦135 mPa.s; and in general ≦1.5 V, preferably ≦1.3 V, at a rotational viscosity of ≦145 mPa.s.

The construction of the STN or MLC display according to the invention from polarizers, electrode base plates and surface-treated electrodes corresponds to the conventional construction for displays of this type. The term conventional construction is broadly drawn here and also covers all variations and modifications of the MLC display, in particular including matrix display elements based on poly-Si TFT or MIM and IPS.

The liquid-crystal mixtures which can be used in, accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation. It is also possible to prepare the mixtures in other conventional manners, for example by using pre-mixtures, for example homologue mixtures, or using so-called "multi-bottle" systems.

The dielectrics may also comprise further additives known to the person skilled in the art and described in the literature. For example, 0–15% by weight, preferably 0–10% by weight, of pleochroic dyes and/or chiral dopants can be added. The additives are each employed in concentrations of from 0.01 to 6% by weight, preferably from 0.1 to 3% by weight. However, the concentration data for the other constituents of the liquid-crystal mixtures, i.e. of the liquid-crystalline or mesogenic compounds, are given without taking into account the concentration of these additives.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is given. In individual cases, the acronym for the parent structure is followed, separated by a hyphen, by a code for the substituents $R^1$, $R^2$, $L^1$ and $L^2$.

| Code für $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |

-continued

| Code für $R^1$ $R^2$, $L^1$, $L^2$ | $R^1$ | $R^2$ | $L^1$ | $L^2$ |
|---|---|---|---|---|
| nS | $C_nH_{2n+1}$ | NCS | H | H |
| rVsN | $C_rH_{2r+1}$—CH=CH—$C_sH_{2s}$— | CN | H | H |
| V-T | $CH_2$=CH | $CF_3$ | H | H |
| V2-T | $CH_2$—CH—$C_2H_4$ | $CF_3$ | H | H |
| 1V-OT | $CH_3$—CH=CH | $OCF_3$ | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |

Preferred Mixture Components are Shown in Tables A and B.

TABLE A

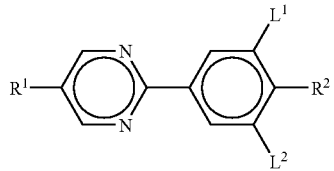

.PYP

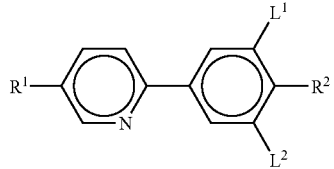

PYRP

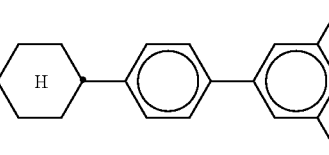

BCH

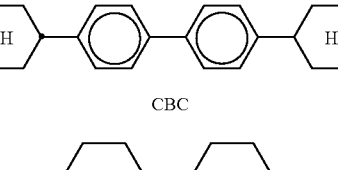

CBC

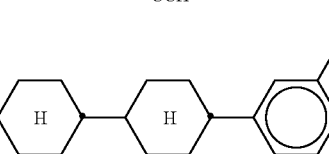

CCH

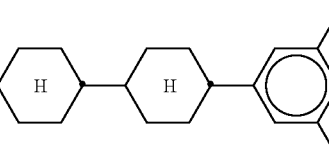

CCP

TABLE A-continued

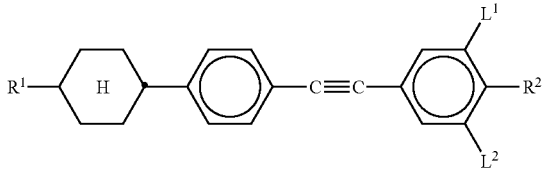

CPTP

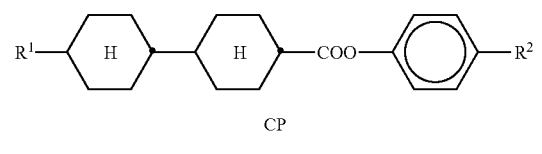

CP

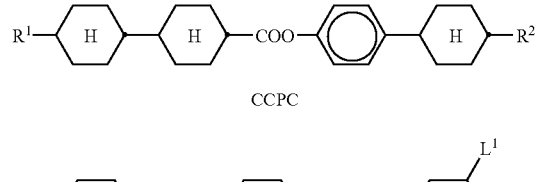

CCPC

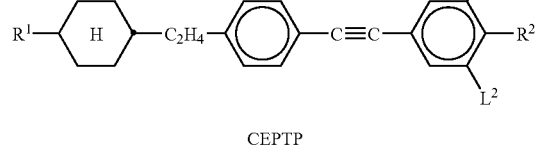

CEPTP

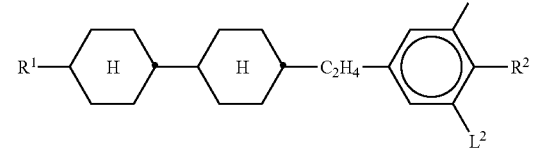

ECCP

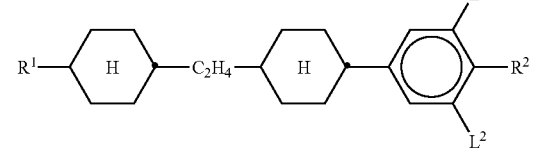

CECP

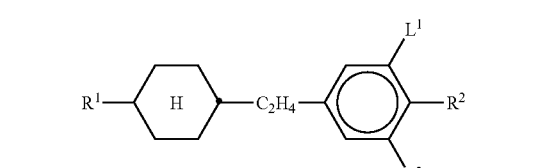

EPCH

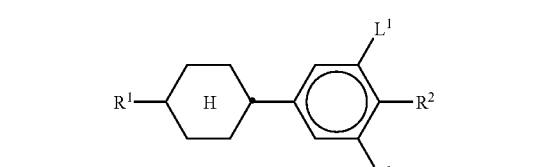

PCH

TABLE A-continued
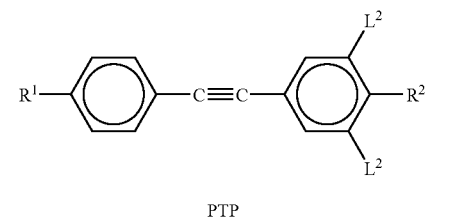
PTP
BECH
EBCH
CPC
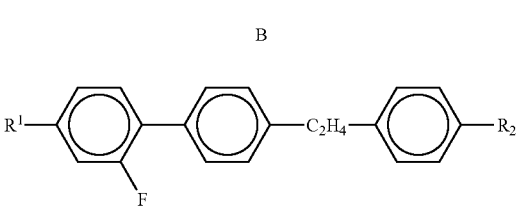
FET-nF
CGG
CGU
CFU
TABLE B
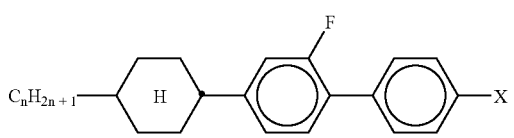
BCH-n.Fm
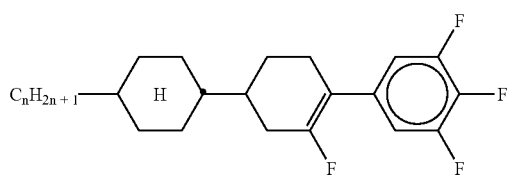
CFU-n-F TABLE B-continued
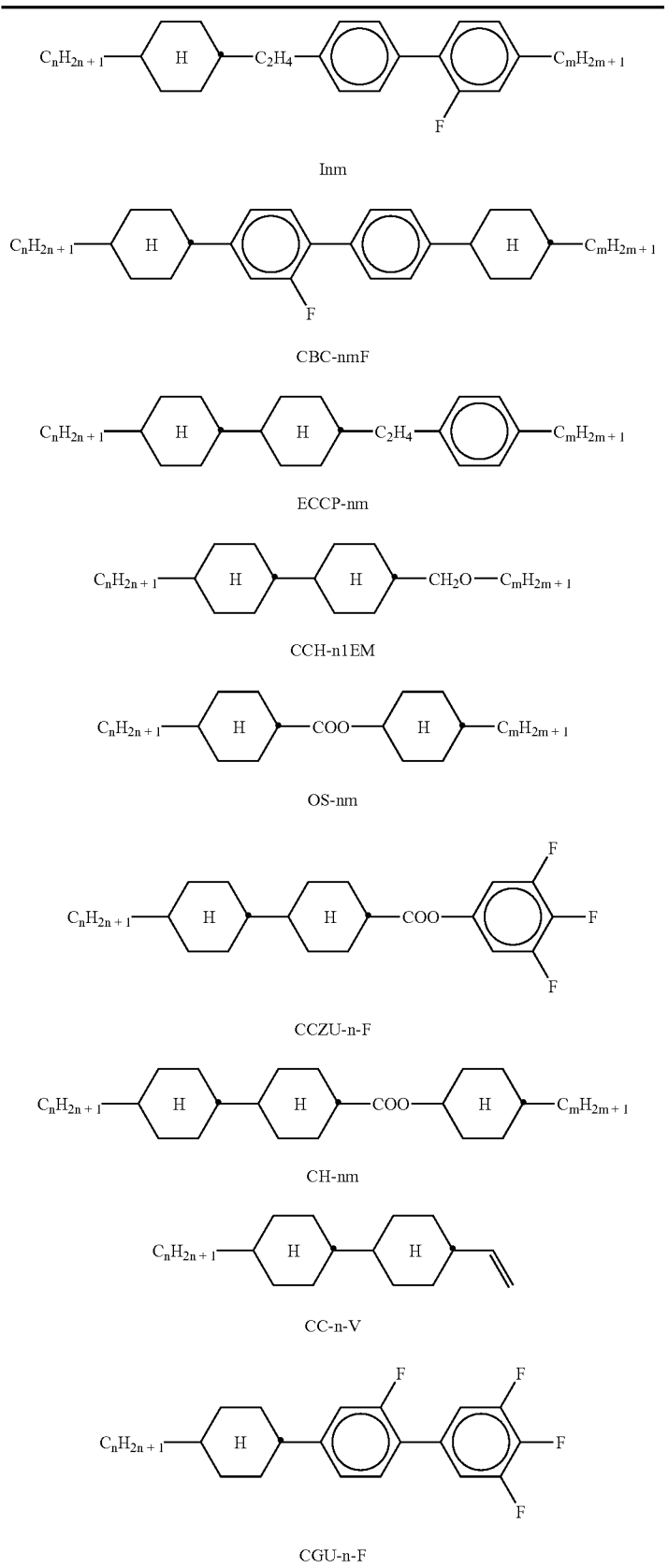

TABLE B-continued

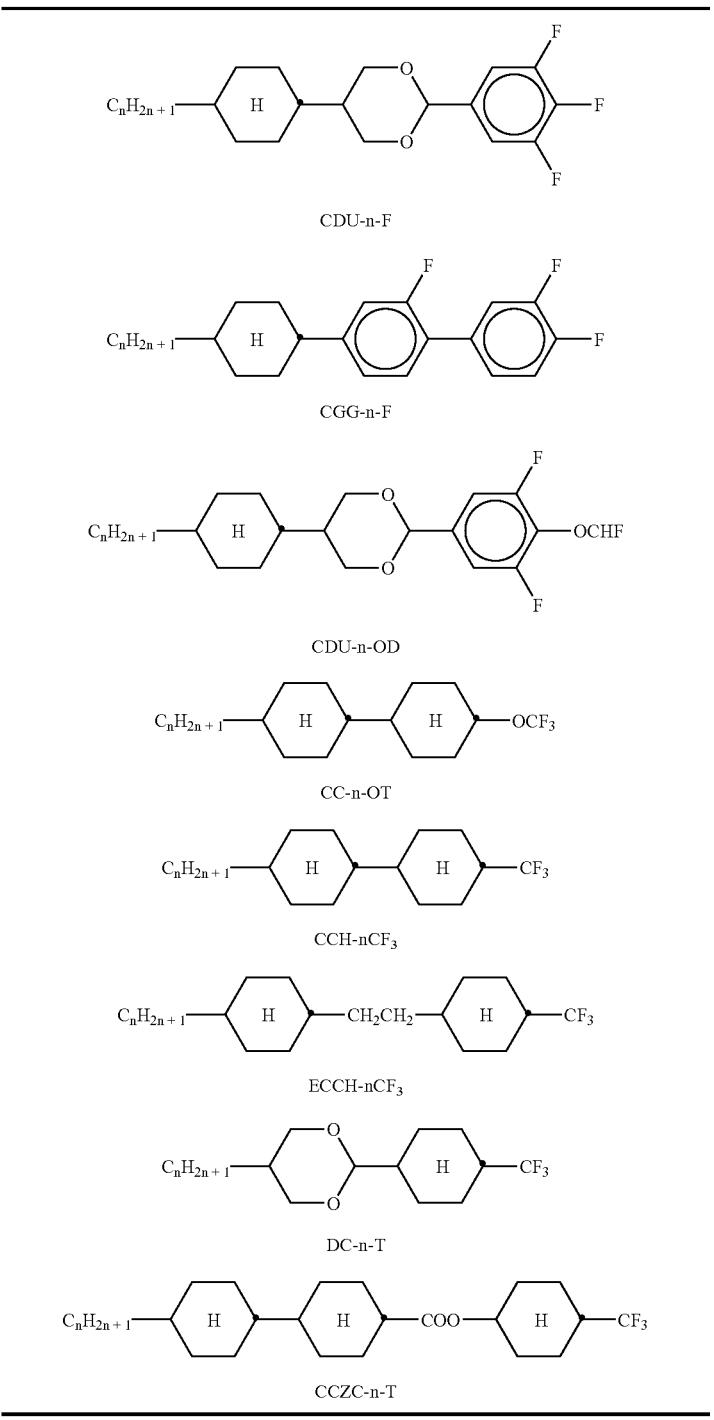

The examples which follow illustrate the invention:

EXAMPLE A–G AND COMPARATIVE EXAMPLES I–IV

Liquid-crystal mixtures having the compositions indicated were prepared. The following measurements were carried out on these mixtures:
temperature of the smectic-nematic phase transition S→N[° C.];

clearing point [° C.]
optical anisotropy Δn at 589 nm and 20° C.;
rotational viscosity $\gamma_1$ at 20° C. [mPa·s];
voltages $V_{10}$, $V_{50}$ and $V_{90}$ for 10%, 50% and 90% transmission, respectively, in viewing direction perpendicular to the plate surface [V];
dielectric anisotropy Δ∈ at 1 kHz and 20° C.

The electro-optical data were measured in a TN cell in the 1 st minimum (d·Δn=0.5) at 20° C.

Example A

| Component | [% by wt.] | Δε |
|---|---|---|
| CC-3-V1 | 10 | −0.5 |
| CC-5-V | 16 | 0.3 |
| CCP-2F.F.F | 10 | 10.3 |
| BCH-3F.F.F | 6 | 12.6 |
| CGU-2-F | 10 | 16.8 |
| CGU-3-F | 10 | 15.2 |
| CCZU-2-F | 4 | 11.2 |
| CCZU-3-F | 16 | 11.1 |
| CGZP-2-OT | 11 | 16.1 |
| CGZP-3-OT | 7 | 15.4 |

| | |
|---|---|
| S → N: | <−30° C. |
| Clearing point: | 69.8° C. |
| Δn: | 0.0893 |
| Δε: | 11.1 |
| γ$_1$: | 12.2 mPa.s |
| d · Δn: | 0.50 |
| V$_{10}$: | 1.06 V |
| V$_{50}$: | 1.31 V |
| V$_{90}$: | 1.64 V |

Example B

| Component | [% by wt.] | Δε |
|---|---|---|
| CC-3-V1 | 8 | −0.5 |
| CC-5-V | 16 | 0.3 |
| CCH-3CF$_3$ | 8 | 6.8 |
| CCH-5CF$_3$ | 5 | 5.3 |
| CCZU-2-F | 8 | 11.2 |
| CCZU-3-F | 14 | 11.1 |
| CGZP-2-OT | 11 | 16.1 |
| CGZP-3-OT | 8 | 15.4 |
| CUZP-2-OT | 12 | 16.8 |
| CUZP-3-OT | 10 | 15.7 |

| | |
|---|---|
| S → N: | <−30° C. |
| Clearing point: | 71.4° C. |
| Δn: | 0.0844 |
| Δε: | 11.4 |
| γ$_1$: | 125 mPa.s |
| d · Δn: | 0.50 |
| V$_{10}$: | 1.11 V |
| V$_{50}$: | 1.37 V |
| V$_{90}$: | 1.71 V |

Example C

| Component | [% by wt.] | Δε |
|---|---|---|
| CC-3-V1 | 7 | −0.5 |
| CC-5-V | 12 | 0.3 |
| PCH-7F | 10 | 3.9 |
| CCH-3CF$_3$ | 5 | 6.8 |
| CCZU-2-F | 7 | 11.2 |
| CCZU-3-F | 14 | 11.1 |
| CCZU-5-F | 3 | 10.3 |
| CGZP-2-OT | 11 | 16.1 |
| CUZP-3-OT | 9 | 15.4 |
| CUZP-2-OT | 12 | 16.8 |
| CUZP-3-OT | 10 | 15.7 |

| | |
|---|---|
| S → N: | <−30° C. |
| Clearing point: | 72.3° C. |
| Δn: | 0.0830 |
| Δε: | 11.1 |
| γ$_1$: | 124 mPa.s |
| d · Δn: | 0.50 |
| V$_{10}$: | 1.07 V |
| V$_{50}$: | 1.33 V |
| V$_{90}$: | 1.65 V |

Example D

| Component | [% by wt.] | Δε |
|---|---|---|
| CCP-2F.F.F | 9.5 | 10.3 |
| CCP-3F.F.F | 1.5 | 9.7 |
| CCZU-2-F | 3.5 | 11.2 |
| CCZU-3-F | 9 | 11.1 |
| CCP-2OCF$_3$ | 6 | 6.7 |
| CCP-3OCF$_3$ | 4 | 6.9 |
| CC-5-V | 20 | 0.3 |
| CC-3-V1 | 5 | −0.5 |
| PCH-3O1 | 6 | −0.4 |
| CGZP-2-OT | 9 | 16.1 |
| CCP-V-1 | 4 | 0.0 |
| CCG-V-F | 10.5 | 4.4 |
| CGU-2-F | 5 | 16.8 |
| CCH-35 | 3.5 | −0.5 |
| CCP-2OCF$_3$.F | 3.5 | 8.6 |

| | |
|---|---|
| S → N: | <−30° C. |
| Clearing point: | +80° C. |
| Δn: | +0.0773 |
| Δε: | +5.9 |
| γ$_1$: | 80 mPa.s |
| d · Δn: | 0.5 |
| V$_{10}$: | 1.72 V |
| V$_{50}$: | 2.07 V |
| V$_{90}$: | 2.61 V |

Example E

| Component | [% by wt.] | Δε |
|---|---|---|
| CCP-2F.F.F | 10 | 10.3 |
| CCP-2OCF$_3$ | 4 | 6.7 |
| CGZP-2-OT | 14 | 16.1 |
| CGZP-3-OT | 10 | 15.4 |
| CCZU-2-F | 4 | 11.2 |
| CCZU-3-F | 15 | 11.1 |
| CCZU-5-F | 3 | 10.3 |
| CGU-2-F | 10 | 16.8 |
| CGU-3-F | 5 | 15.2 |
| PGU-2-F | 8 | 20.4 |
| PGU-3-F | 6 | 19.6 |
| CC-3-V | 11 | −0.7 |

| | |
|---|---|
| S → N: | <−40° C. |
| Clearing point: | +69.5° C. |
| Δn: | +0.1052 |
| Δε: | — |
| γ$_1$: | 132 mPa.s |
| d · Δn: | 0.5 |
| V$_{10}$: | 0.98 V |
| V$_{50}$: | 1.20 V |
| V$_{90}$: | 1.50 V |

Example F

| Component | [% by wt.] | Δε |
|---|---|---|
| CC-3-V1 | 5 | −0.5 |
| CCH-34 | 6 | −0.4 |
| CCP-2F.F.F | 11 | 10.3 |
| CCP-3F.F.F | 9 | 9.7 |
| CCP-2OCF$_3$ | 1 | 6.7 |
| CGU-2-F | 11 | 16.8 |
| CGU-3-F | 11 | 15.2 |
| CGU-5-F | 5 | 14.6 |
| CCZU-2-F | 5 | 11.2 |
| CCZU-3-F | 15 | 11.1 |
| CCZU-5-F | 3 | 10.3 |
| CGZP-2-OT | 11 | 16.1 |
| CGZP-3-OT | 7 | 15.4 |

| | |
|---|---|
| S → N: | −40° C. |
| Clearing point: | +70.5° C. |
| Δn: | +0.0902 |
| Δε: | +12.3 |
| γ$_1$: | 144 mPa.s |
| d · Δn: | 0.5 |
| V$_{10}$: | 1.00 V |
| V$_{50}$: | 1.24 V |
| V$_{90}$: | 1.56 V |

Example G

| Component | [% by wt.] | Δε |
|---|---|---|
| CCP-2F.F.F | 10 | 10.3 |
| CGZP-2-OT | 10 | 16.1 |
| CGZP-3-OT | 10 | 15.4 |
| CCZU-2-F | 4 | 11.2 |
| CCZU-3-F | 15 | 11.1 |
| CCZU-5-F | 2 | 10.3 |
| CGU-2-F | 9 | 16.8 |
| CGU-3-F | 7 | 15.2 |
| PGU-2-F | 9 | 20.4 |
| PGU-3-F | 9 | 19.6 |
| CC-3-V1 | 10 | −0.5 |
| CCH-35 | 5 | −0.5 |

| | |
|---|---|
| S → N: | — |
| Clearing point: | +70.4° C. |
| Δn: | +0.1099 |
| Δε: | +14.8 |
| γ$_1$: | 135 mPa.s |
| d · Δn: | 0.5 |
| V$_{10}$: | 1.00 V |
| V$_{50}$: | 1.21 V |
| V$_{90}$: | 1.51 V |

Comparative Example I

| Component | [% by wt.] | Δε |
|---|---|---|
| PCH-7F | 9 | 3.9 |
| CC-5-V | 13 | 0.3 |
| CCP-2OCF$_3$ | 8 | 6.7 |
| CCP-3OCF$_3$ | 7 | 6.9 |
| CCP-4OCF$_3$ | 5 | 6.3 |
| CCP-5OCF$_3$ | 7 | 5.6 |
| CCP-2F.F.F | 9 | 10.3 |
| CCP-3F.F.F | 11 | 9.7 |
| CCP-5F.F.F | 6 | 8.4 |
| CCP-2OCF3.F | 10 | 8.6 |
| CCP-3OCF3.F | 6 | 9.0 |
| CCG-V-F | 9 | 4.4 |

| | |
|---|---|
| S → N: | <−40° C. |
| Clearing point: | +83.5° C. |
| Δn: | +0.0745 |
| Δε: | +5.9 |
| γ$_1$: | 110 mPa.s |
| d · Δn: | 0.5 |
| V$_{10}$: | 1.78 V |
| V$_{50}$: | 2.18 V |
| V$_{90}$: | 2.74 V |

Comparative Example II

| Component | [% by wt.] | Δε |
|---|---|---|
| CCP-2F.F.F | 12 | 10.3 |
| CCP-3F.F.F | 9 | 9.7 |
| CCP-5F.F.F | 8 | 8.4 |
| CCP-2OCF$_2$.F.F | 4 | 9.6 |
| CCP-3OCF$_2$.F.F | 7 | 8.8 |
| CCP-2OCF$_3$ | 6 | 6.7 |
| CCP-3OCF$_3$ | 8 | 6.9 |
| CCP-4OCF$_3$ | 6 | 6.3 |
| CCP-5OCF$_3$ | 8 | 5.6 |
| CGU-2-F | 12 | 16.8 |
| CGU-3-F | 10 | 15.2 |
| CGU-5-F | 10 | 14.6 |

| | |
|---|---|
| S → N: | <+40° C. |
| Clearing point: | +76.0° C. |
| Δn: | +0.0928 |
| Δε: | +10.6 |
| γ$_1$: | 175 mPa.s |
| d · Δn: | 0.5 |
| V$_{10}$: | 1.20 V |
| V$_{50}$: | 1.47 V |
| V$_{90}$: | 1.86 V |

Comparative Example III

| Component | [% by wt.] | Δε |
|---|---|---|
| CCP-2F.F.F | 12 | 10.3 |
| CCP-3F.F.F | 12 | 9.7 |
| CCP-3OCF$_3$.F | 3 | 9.0 |
| CCP-2OCF$_3$ | 7 | 6.7 |
| CCP-3OCF$_3$ | 8 | 6.9 |
| CCP-5OCF$_3$ | 7 | 5.6 |
| CGU-2-F | 8 | 16.8 |
| CGU-3-F | 9 | 15.2 |
| CGU-5-F | 6 | 14.8 |
| CCZU-2-F | 5.5 | 11.2 |
| CCZU-3-F | 14 | 11.1 |
| CCZU-5-F | 5.5 | 10.3 |
| CBC-39F | 3 | 0.0 |

| | |
|---|---|
| S → N: | <−40° C. |
| Clearing point: | +91° C. |
| Δn: | +0.0921 |
| Δε: | +11.3 |

-continued

| | | |
|---|---|---|
| γ1: | 186 mPa.s | |
| d · Δn: | 0.5 | |
| $V_{10}$: | 1.28 V | |
| $V_{50}$: | 1.56 V | |
| $V_{90}$: | 1.98 V | |

Comparative Example IV

| Component | [% by wt.] | Δε |
|---|---|---|
| CCP-2F.F.F | 8 | 10.3 |
| CCP-3F.F.F | 10 | 9.7 |
| CCP-5F.F.F | 4 | 8.4 |
| CCP-2OCF$_3$ | 6 | 6.7 |
| CCP-3OCF$_3$ | 4 | 6.9 |
| CGU-2-F | 10 | 10.8 |
| CGU-3-F | 6 | 15.2 |
| CGU-5-F | 2 | 14.6 |
| CCZU-2-F | 4 | 11.2 |
| CCZU-3-F | 18 | 11.1 |
| CCZU-5-F | 4 | 10.3 |
| CCG-V-F | 10.6 | 4.4 |
| CC-5-V | 6.4 | 0.3 |

| | |
|---|---|
| S → N: | <−40° C. |
| Clearing point: | +81° C. |
| Δn: | +0.0846 |
| Δε: | +10.4 |
| γ$_1$: | 134 mPa.s |
| d · Δn: | 0.5 |
| $V_{10}$: | 1.21 V |
| $V_{50}$: | 1.51 V |
| $V_{90}$: | 1.95 V |

The invention claimed is:

1. A liquid-crystalline medium comprising a mixture of at least two compounds of formula (I)

$$R^1\text{-}A_m\text{-}B_n\text{-}Z^1\text{-}C\text{-}Z^2\text{-}D\text{-}R^2 \qquad (I)$$

in which $R^1$ is H, an alkyl group having 1 to 15 carbon atoms or alkenyl group having 2 to 15 carbon atoms, which is unsubstituted, monosubstituted by CN or CF$_3$ or at least monosubstituted by halogen, in which one or more CH$_2$ groups are optionally, in each case independently of one another, replaced by —O—, —S—,

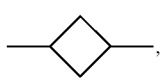

—CO—, —CO—O—, —O—CO— or —O—CO—O— in such a way that O atoms are not linked directly to one another;

A, B, C and D are each, independently of one another,

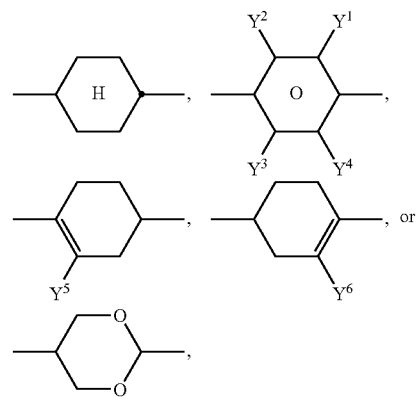

C is, in addition to the above-mentioned meanings,

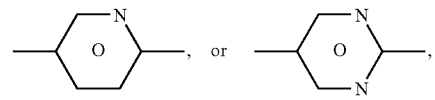

$Y^1$, $Y^2$, $Y^3$, $Y^4$, $Y^5$ and $Y^6$ are each, independently of one another, H or F;

$Z^1$ and $Z^2$ are each, independently of one another, a single bond, —CH$_2$O—, —OCH$_2$—, —CH$_2$—CH$_2$—, —CH═CH—, —C≡C—, —CF$_2$—CF$_2$—, —CF$_2$O—, —OCF$_2$— or —CO—O—;

$R^2$ is, in addition to the above-mentioned meanings of $R^1$, F, CF$_3$, OCF$_3$, OCHF$_2$, or OCH$_2$CF$_2$H; and m and n are each, independently of one another, 0 or 1, with the proviso that $Z^1$ is a single bond when m and n are 0, wherein the mixture comprises either I)
a) 40 to 80% by weight one or more compounds of formula (I) having Δε ≧ 9;
b) 0 to 25% by weight one or more compounds of formula (I) having 1 < Δε < 9; and
c) 15 to 40% by weight one or more compounds of formula (I) having −1 ≦ Δε ≦ 1;

or

II)
a) 70 to 90% by weight one or more compounds of formula (I) having Δε ≧ 9;
b) 0 to 10% by weight one or more compounds of formula (I) having 1 < Δε < 9; and
c) 10 to 20% by weight one or more compounds of formula (I) having −1 ≦ Δε ≦ 1;

the sum of a), b) and c) being 100% by weight, and wherein the at least two compounds of formula I are liquid crystalline and/or mesogenic.

2. A liquid-crystalline medium according to claim 1, comprising
a) 40 to 80% by weight one or more compounds of formula (I) having Δε ≧ 9;
b) 0 to 25% by weight one or more compounds of formula (I) having 1 < Δε < 9; and
c) 15 to 40% by weight one or more compounds of formula (I) having −1 ≦ Δε ≦ 1.

3. A liquid-crystalline medium according to claim 1, wherein the one or more compounds of formula (I) having $\Delta\epsilon$9 have either i) $Z^2$=—CO—O—, —CF$_2$O, or —OCF$_2$—, and $R^2$=F, or OCF$_3$ ii)

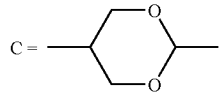

$Z^2$=single bond, and $R^2$=F, OCF$_3$, or OCHF$_2$;

or iii)

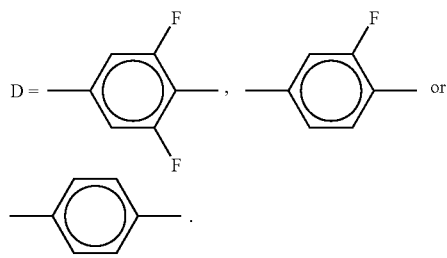

4. A liquid-crystalline medium according to claim 1, wherein the one or more compounds of formula (I) having $1<\Delta\epsilon<9$ have $Z^2$=single bond, C$_2$H$_4$, —CH=CH—, —C≡C—, —CF$_2$—CF$_2$—, or —CF$_2$O—,

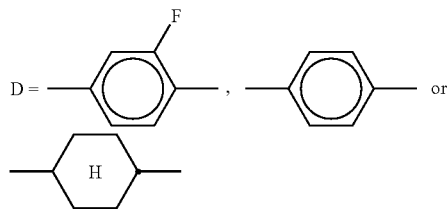

and $R^2$=F, OCF$_3$, or CF$_3$.

5. A liquid-crystalline medium according to claim 1, wherein the one or more compounds of formula (I) having $-1\leq\Delta\epsilon 1$ have

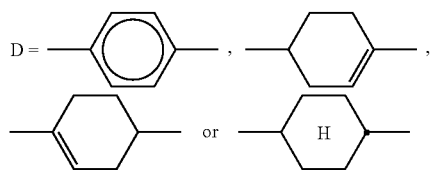

and m and n are 0, and $Z^2$=single bond, —CH$_2$—CH$_2$—, —CH=CH— or —C≡C— when $R^2$=F, CF$_3$, OCF$_3$ or OCHF$_2$.

6. A liquid-crystalline medium according to claim 1, wherein the one or more compounds of formula (I) having $\Delta\epsilon\geq 9$ are compounds of formulae (Va), (Vb), (Vc), (Vd) and/or (Ve)

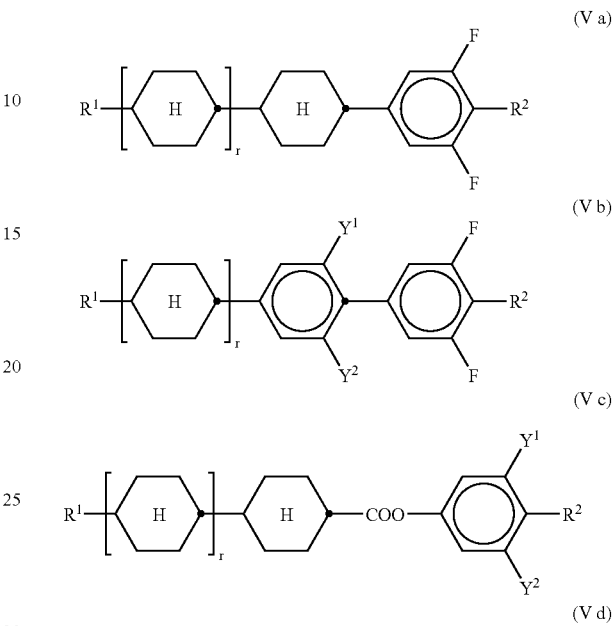

in which $R^1$ is an alkyl group having 1 to 15 carbon atoms or an alkenyl group having 2 to 15 carbon atoms;

$Y^1$, $Y^2$, $Y^3$ and $Y^4$ are each, independently of one another, H or F;

$R^2$ is F or OCF$_3$, and r is 0, 1 or 2.

7. A liquid-crystalline medium according to claim 1, wherein the one or more compounds of formula (I) having $-1\leq\Delta\epsilon\leq 1$ are compounds of formulae (VIa) and/or (VIb)

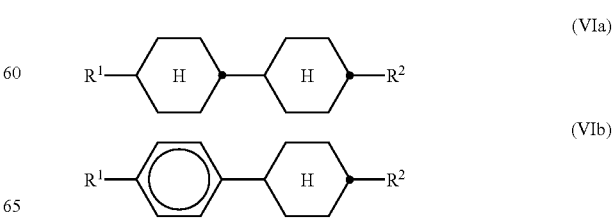

in which
R¹ and R² are each, independently of one another, an alkyl group having 1 to 15 carbon atoms or an alkenyl group having 2 to 15 carbon atoms.

8. Liquid-crystalline medium according to claim 1, wherein the one or more compounds of formula (I) having 1<Δε<9 are compounds of formulae (VIIa) and/or (VIIb)

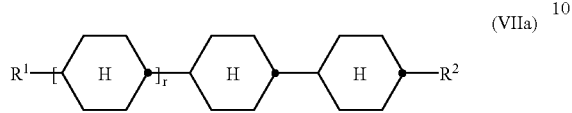
(VIIa)

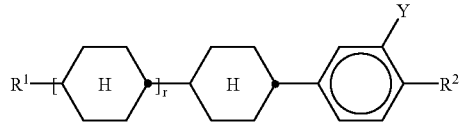
(VIIb)

in which
R¹ is an alkyl group having 1 to 15 carbon atoms or an alkenyl group having 2 to 15 carbon atoms,
R² is F, $CF_3$ or $OCF_3$,
Y is H or F, and
r is 0 or 1.

9. An electro optical display containing a liquid-crystalline medium according to claim 1.

10. A liquid-crystalline medium comprising a mixture of at least two compounds of formula (I)

$$R^1\text{-}A_m\text{-}B_n\text{-}Z^1\text{-}C\text{-}Z^2\text{-}D\text{-}R^2 \qquad (I)$$

in which
R¹ is H, an alkyl group having 1 to 15 carbon atoms or alkenyl group having 2 to 15 carbon atoms, which is unsubstituted, monosubstituted by CN or $CF_3$ or at least monosubstituted by halogen, in which one or more $CH_2$ groups are optionally, in each case independently of one another, replaced by —O—, —S—,

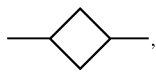,

—CO—, —CO—O—, —O—CO— or —O—CO—O— in such a way that O atoms are not linked directly to one another;
A, B, C and D are each, independently of one another,

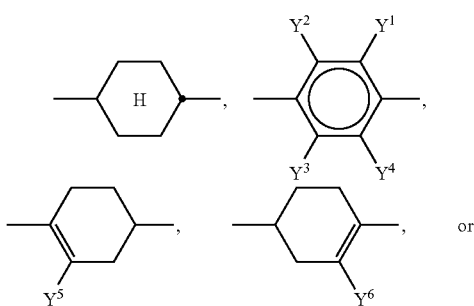

-continued

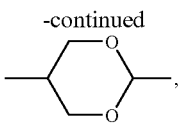,

C is, in addition to the above-mentioned meanings,

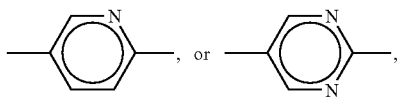

Y¹, Y², Y³, Y⁴, Y⁵ and Y⁶ are each, independently of one another, H or F;
Z¹ and Z² are each, independently of one another, a single bond, —$CH_2O$—, —$OCH_2$—, —$CH_2$—$CH_2$—, —CH=CH—, —C≡C—, —$CF_2$—$CF_2$—, —$CF_2O$—, —$OCF_2$— or —CO—O—;
R² is, in addition to the above-mentioned meanings of R¹, F, $CE_3$, $OCF_3$, $OCHF_2$, or $OCH_2CF_2H$; and
m and n are each, independently of one another, 0 or 1, with the proviso that Z¹ is a single bond when m and n are 0, wherein the mixture comprises
a) 70 to 90% by weight one or more compounds of formula (I) having Δε≧9;
b) 0 to 10% by weight one or more compounds of formula (I) having 1<Δε<9; and
c) 10 to 20% by weight one or more compounds of formula (I) having −1≦Δε≦1;
the sum of a), b) and c) being 100% by weight, and wherein the at least two compounds of formula I are liquid crystalline and/or mesogenic.

11. A liquid-crystalline medium according to claim 10, wherein the one or more compounds of formula (I) having Δε≧9 have either
i) Z²=—CO—O—, —$CF_2O$, or —$OCF_2$—, and R²=F, or $OCF_3$
ii)

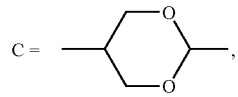

$Z^2$=single bond, and R²=F, $OCF_3$, or $OCH F_2$;
or
iii)

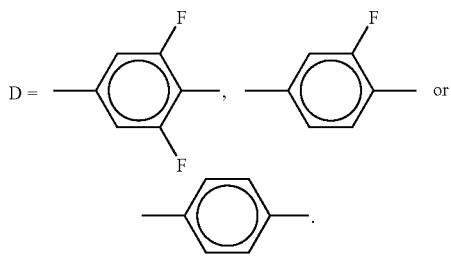

12. A liquid-crystalline medium according to claim 10, wherein the one or more compounds of formula (I) having $1<\Delta\epsilon<9$ have $Z^2$=single bond, $C_2H_4$, —CH=CH—, —C≡C—, —$CF_2$—$CF_2$—, or —$CF_2O$—, D = [2-fluoro-1,4-phenylene], [1,4-phenylene] or

[trans-1,4-cyclohexylene (H)]

and $R^2$=F, $OCF_3$, or $CF_3$.

13. A liquid-crystalline medium according to claim 10, wherein the one or more compounds of formula (I) having $-1 \leq \Delta\epsilon \leq 1$ have D = [1,4-phenylene], [cyclohex-1-enylene], [cyclohex-3-enylene] or [trans-1,4-cyclohexylene (H)]

and m and n are 0, and $Z^2$=single bond, —$CH_2$—$CH_2$—, —CH=CH— or —C≡C— when $R^2$=F, $CF_3$, $OCF_3$ or $OCHF_2$.

14. A liquid-crystalline medium according to claim 10, wherein the one or more compounds of formula (I) having $\Delta\epsilon \geq 9$ are compounds of formulae (Va), (Vb), (Vc), (Vd) and/or (Ve)

$$R^1-[H]-[H]_r-[\text{3,5-difluorophenyl}]-R^2 \quad (Va)$$

$$R^1-[H]_r-[\text{phenyl-}Y^1,Y^2]-[\text{3,5-difluorophenyl}]-R^2 \quad (Vb)$$

$$R^1-[H]-[H]_r-COO-[\text{phenyl-}Y^1,Y^2]-R^2 \quad (Vc)$$

$$R^1-[H]_r-[\text{phenyl-}Y^3,Y^4]-COO-[\text{phenyl-}Y^1,Y^2]-R^2 \quad (Vd)$$

$$R^1-[H]_r-[\text{dioxane}]-[\text{phenyl-}Y^1,Y^2]-R^2 \quad (Ve)$$

in which $R^1$ is an alkyl group having 1 to 15 carbon atoms or an alkenyl group having 2 to 15 carbon atoms;

$Y^1, Y^2, Y^3$ and $Y^4$ are each, independently of one another, H or F;

$R^2$ is F or $OCF_3$, and r is 0, 1 or 2.

15. A liquid-crystalline medium according to claim 10, wherein the one or more compounds of formula (I) having $-1 \leq \Delta\epsilon \leq 1$ are compounds of formulae (VIa) and/or (VIb)

$$R^1-[H]-[H]-R^2 \quad (VIa)$$

$$R^1-[\text{phenyl}]-[H]-R^2 \quad (VIb)$$

in which $R^1$ and $R^2$ are each, independently of one another, an alkyl group having 1 to 15 carbon atoms or an alkenyl group having 2 to 15 carbon atoms.

16. Liquid-crystalline medium according to claim 10, wherein the one or more compounds of formula (I) having $1<\Delta\epsilon<9$ are compounds of formulae (VIIa) and/or (VIIb)

$$R^1-[H]-[H]-[H]_r-R^2 \quad (VIIa)$$

-continued
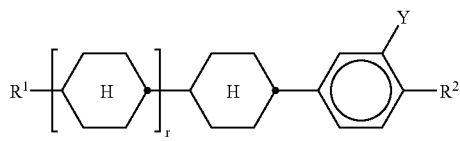
(VIIb)
in which
R[1] is an alkyl group having 1 to 15 carbon atoms or an alkenyl group having 2 to 15 carbon atoms,
R[2] is F, $CF_3$ or $OCF_3$,
Y is H or F,
and
r is 0 or 1.
17. An electro optical display containing a liquid-crystalline medium according to claim 10.
* * * * *

UNITED STATES PATENT AND TRADEMARK OFFICE
CERTIFICATE OF CORRECTION

PATENT NO. : 7,033,651 B2
APPLICATION NO. : 10/257635
DATED : April 25, 2006
INVENTOR(S) : Michael Heckmeier et al.

It is certified that error appears in the above-identified patent and that said Letters Patent is hereby corrected as shown below:

Column 30, line 35, reads "$CE_3$" should read -- $CF_3$ --

Column 31, line 3, reads "$\Delta\epsilon 9$" should read -- $\Delta\epsilon \geq 9$ --

Column 31, line 51, reads "$-1 \leq \Delta\epsilon 1$" should read -- $-1 \leq \Delta\epsilon \leq 1$ --

Column 34, line 23, reads "$CE_3$" should read -- $CF_3$ --

Column 34, line 50, reads "$OCH\ F_2$" should read -- $OCHF_2$ --

Signed and Sealed this

Twenty-seventh Day of February, 2007

JON W. DUDAS
*Director of the United States Patent and Trademark Office*